United States Patent [19]

Coutcher

[11] Patent Number: 4,611,427
[45] Date of Patent: Sep. 16, 1986

[54] COLLAPSIBLE FISHING ROD HOLDER

[76] Inventor: Halsey Coutcher, 5377 Bayshore Rd., Oregon, Ohio 43616

[21] Appl. No.: 656,270

[22] Filed: Oct. 1, 1984

[51] Int. Cl.$^4$ ............................................. A01K 97/10
[52] U.S. Cl. ..................................... 43/21.2; 248/512; 248/533
[58] Field of Search ................. 43/21.2; 248/511, 512, 248/513, 530, 532, 533, 523

[56] References Cited

U.S. PATENT DOCUMENTS

| 2,572,937 | 10/1951 | Lawson | 248/533 |
| 2,683,008 | 7/1954 | Roederer | 248/533 |
| 3,020,014 | 2/1962 | Emery | 248/533 |
| 3,385,544 | 5/1968 | Barnett | 248/513 |

FOREIGN PATENT DOCUMENTS 2015851 9/1979 United Kingdom ................. 43/21.2

Primary Examiner—Gene P. Crosby
Attorney, Agent, or Firm—Paul F. Stutz

[57] ABSTRACT

A three member fishing rod holder including a ground engaging leg and two pivotably connected arms with fishing rod supporting fingers. The leg and arm is configurated for folding into compact storage position with leg and arms in side-by-side relationship.

11 Claims, 3 Drawing Figures

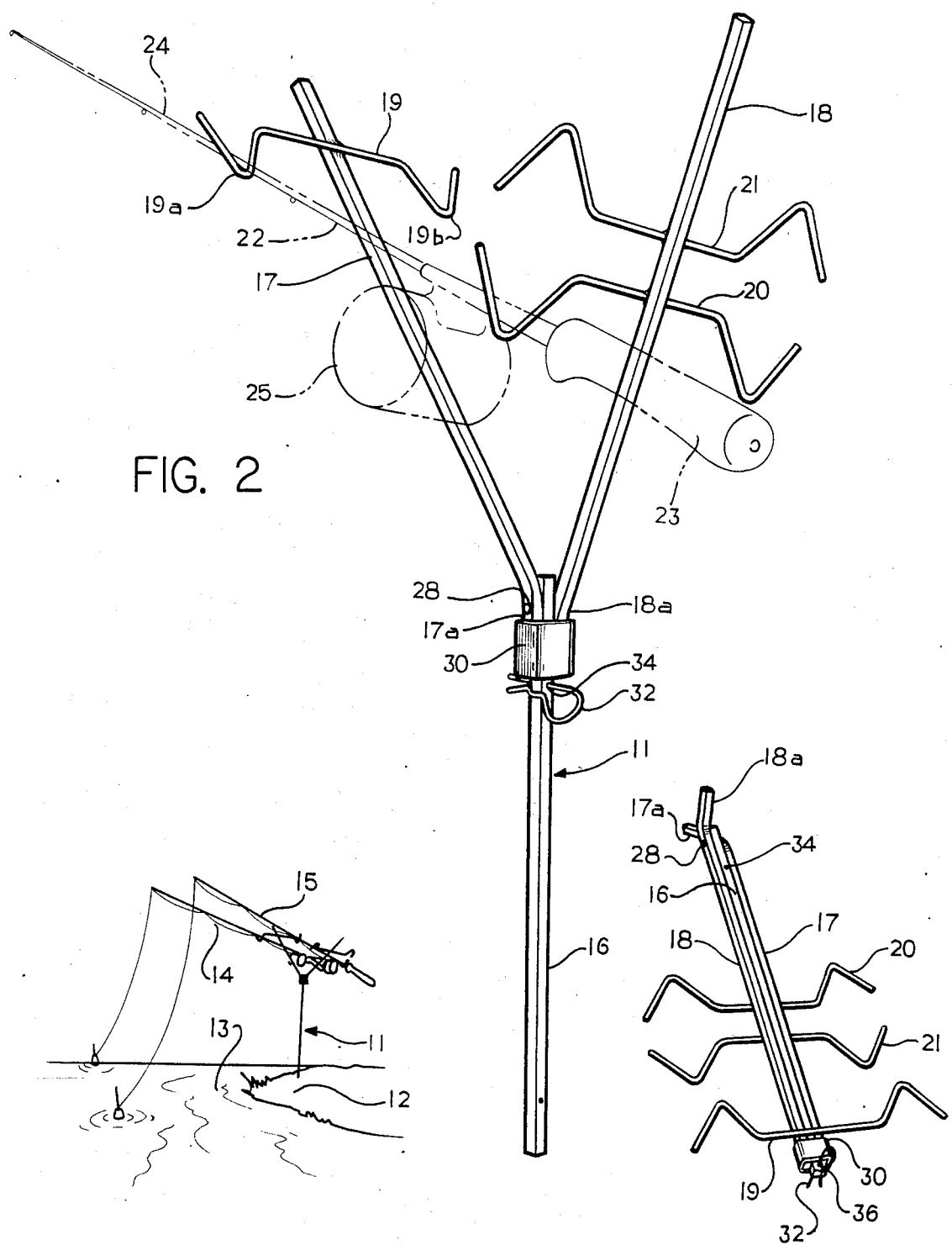

COLLAPSIBLE FISHING ROD HOLDER

The present invention relates to the recreational arts, more particularly, the present invention relates to the art of sport fishing.

Since fishing, as a means of obtaining food, and for sport, has been practiced since time immemorial, no detailed or elaborate explanation is needed; other than to distinguish the field of this invention known as "hook and line" fishing from others known as gaff, spear, bow and arrow or net fishing.

As indicated, the present invention relates to "hook and line" fishing, preferrably employing a rod and desirably, a reel; the latter two extending the distance at which the baited hook can be located away from the fisherman in his boat or shore position. The rod may vary in length from several feet to 8 or 9 feet or even to 15 to 17 feet in cane pole type rods and the reel is essentially a reservoir for a line which is mechanically designed for retrival upon manipulation of a crank and free reeling by a whipping action of the rod to propel the bait and/or sinker and/or lure and/or bobber to the proper location in the river, stream, or lake or body of water being fished.

In order to increase the enjoyment of the fisherman and to relieve him from the tediousness of simply holding the rod for an indeterminate period of time between catches or strikes, it is frequently desirable to provide for locating the rod in a make shift prop. One such make shift prop is simply a shore side piece of wood with a fork or crutch at one end. The other is urged or stuck into the ground with the fork end up serving as a resting spot or crutch for the mid or upper region of the rod and with the handle reel region resting on the ground or snugged under a log or rock, to complete the security of the rod and reel. The make shift devices have the obvious defects in that the shore side limb may not be found or is otherwise unsuitable by reason of its native contour.

Suffice it to say, that there have appeared on the market, a number of manufactured support or prop devices, and such are disclosed in various U.S. patents such as the following: U.S. Pat. Nos. Des. 190,330; 1,435,085; 3,411,231; 1,619,152; 2,555,982; 3,636,649; 2,630,993; 4,344,248; 2,628,048; 2,704,412; 2,519,612; 4,407,089; 221,279; 2,964,868; 2,176,352; 2,515,426; and British No. 900,574.

An examination of these patents reveals that none of them contain the desirable combination of features possessed by that of the device constituting my invention.

Certain of these are quite complicated, cumbersome and costly, while several others are deficient in portability and the ease of storability.

With the foregoing introduction, it is an object of the present invention to provide a fishing rod support or prop device of extremely simplified design.

It is an additional object of the present invention to provide such a device which is extremely light weight and therefore portable; which is easily foldable into storable configuration and just as easily and quickly unfoldable and securely erected into operative condition or configuration ready for use.

It is a significant object of the present invention to provide such a fishing rod support or prop device which is extremely economical to fabricate due to the simplified, yet multi-functional, construction.

The foregoing, and, as well, other objects of the present invention, will become apparent to those skilled in the art from the following more detailed description taken in conjunction with the annexed sheet of drawings in which there is presented, for purposes of illustration only, a single embodiment of the present invention as currently envisioned.

Considered most simply, the present invention contemplates a novel fishing rod holder featuring a pair of fishing rod support arm members, pivotably secured to a ground engaging leg member; said mutually pivotable relationship, coupled with bent ends of each of said arm members proximate said pivotable connection, permit said arm members and leg members to assume side-by-side position in space-saving, storage relationship and to be unfolded to erect into a "Y" shaped configuration. A sleeve/collar member and pin serves to hold said holder in either of said positions.

In the drawings:

FIG. 1 is a perspective, partially schematic view of the device of the inventonn implanted on a shore and bearng two fishing rods, all in accordance with the precepts of the present invention.

FIG. 2 is a three-quater perspective view of the deivce of the invention carrying a single fishing rod and reel, shown in dotted outline.

FIG. 3 is a three-quarter perspective view of the device of FIG. 1, shown in its' collapsed and with respective parts, in mutual, folded relationship, ready for compact storage.

Referring now more specifically to the drawings, there is shown, in FIG. 1, the rod holder device of the present invention, identified by the reference numeral 11, in operative use, with its leg member stuck into the ground 12 next to a body of water 13 and with a pair of fishing rods 14 and 15 resting on the holder in a manner as will become more clear from the other figures and the following description.

Referring now to FIG. 2, the aforesaid fishing rod holder 11 is shown in its erected operative position with its ground engaging leg 16, pointing vertically downward while its fishing rod support arms 17 and 18 are shown angularly disposed upwardly in different directions. Arm 17 has secured thereto, a transverse finger 19 with bends 19a and 19b formed on either side of the connection to the arm to define spaced crotches open at the top. Arm 18 has, secured thereto, a pair of lateral transverse fingers 20 and 21 with bends formed on either side of the connection in the manner shown. The fingers are slightly spaced apart with finger 20, being bent like the finger 19, while the finger 21 is bent oppositely for safe reception of the base portion of a pair of fishing poles, only 22 being shown in dotted outline, since they form no part of the present invention.

The leg member 16 and two arm members 17 and 18 are pinned together as at 28; whereby they are mutually pivotable with respect to each other. As can be seen, the arm members 17 and 18 each have a bent end portion 17a and 18a which extend in opposite directions. It is this feature, which, upon pivotable movement of the arms, to bring the bent end portions 17a and 18a into side-by-side parallel relationship with the leg member 16, automatically yields the proper spatial attitude of the arm members in the opposite direction and for reception of the pair of the fishing rods resting on fingers 19, 20 and 21.

The fishing rod 22, as shown in dotted outline, comprises a handle region 23, an outer wand like extended end 24, and a reel 25; the operation of which needs no detailed description since such would be well understood by those normally skilled in the fishing art and who would be the proper and appropriate users of the fishing rod holder 11, of the present invention.

The reference numeral 30 identifies a sleeve or collar which is slightly elongated, as shown, in order to snugly embrace, telescopically, the bent ends 17a and 18a of the arm members 17 and 18 situated in erected relationship on either side of the leg member 16. A clevis pin or cotter pin 32 fits through or engages a hole or aperture 34 in the leg member 16 just beneath the collar to preclude downward movement of the sleeve or collar 30, thus assuring encircling snug relationship of the bent ends and adjacent leg member to hold the assembly in the appropriate and proper attitude.

It is a significant feature of the present invention that the mutually pivotably relationship and configuration of the leg member 16 and arm members 17 and 18, permit them to be pivoted into the relationship shown in FIG. 3 best adapted for storage. This relationship is secured by telescoping the same sleeve member 30 telescopically around the free ends of the leg and arm members, in the manner shown, and engaging the clevis or cotter pin through the hole or aperture 36 near the end of the leg member 16.

In this manner, position and relationship, the rod holder member, in a preferred embodiment, measures only about 12" in length, and a cross-sectional space measuring not more than $\frac{3}{4}"\times\frac{3}{8}"$. In this spirit, the finger extensions on each of the arm members 17 and 18, are designed, constructed and arranged to lie in the same plane to thereby achieve economy of space for storage purposes. Storage can be anywhere, but it has been found that the fishermans lure and tackle box is convenient and the features, constructional detail and precepts of the present allow such storage.

The rod holder of the present invention, and, as illustrated, is fabricated of rod stock measuring about $\frac{1}{4}"$ on each edge and with each leg and arm member about 12" in length. The lateral crotch defining members 19, 20 and 21 span a distance of not more than about 6" or 7" and, as indicated, are all generally in the same plane so that they lie flat. The rod stock of which they are made, measures about 1/16" to 3/32" and is, in the embodiment shown, welded to their respective arms.

It is an advantageous feature of the rod holder device of the present invention, that the fishing rod and reel of the user can be located within easily and can be just as easily removed from the holder 11, and specifically from the fingers 19 and the rear set of fingers 20 and 21. Thus, the user simply grasps the handle of the rod and lifts it slightly from the lower finger 20 and thence moves the entire rod and reel assembly laterally or side ways, without any axial movement of the rod, as might otherwise interfere with or change the tension of the line, and consequently, the movement of the lure or hook, adverse to the securement of the lure or hook with the fish as caught or about to be caught.

It will be appreciated that the fishing rod holder could be fabricated of other materials other than metal, such as plastics of sufficient strength. It is within the skill of the manufacturing arts to elect or select desirable materials of construction having in mind constructional details, the environment of use and the repetitiveness of the shifting or moving from storage relationship of the components to rod holding and usage relationship.

While the embodiment shown in the drawing represents a preferred example of the present invention; it is clear that the upper end of leg member 16 could be bent rather than straight. At the same time, the adjacent bent ends of arm members 17 and 18 could be bent differently than shown, to accomodate the bend in the leg member 16 so that the proper spatial attitude of the arm members would be achieved. Obviously, the precise amount of bend is not critical, but is determined by consideration of the achievement of the desired spatial attitude of the two arm members when fully erected for use as a prop and support for fishing rods as shown.

While I have shown the device as constructed for use with two fishing rods at the same time; it will be clear that the transverse rod design as to members 19, 20 and 21 could be easily changed to accomodate a single fishing rod.

Modification, substitutions and obvious changes may be suggested to those skilled in the art, from the foregoing description. Accordingly, it is intended to include all such obvious substitutions, modifications, and changes as within the spirit and scope of the present invention unless to do so would violate the language of the appended claims.

I claim:

1. A three membered fishing rod holder comprising a ground-engaging leg member and two pivotably connected arm members releasably securable to said leg member, in a first position with arm members extending upwardly and outwardly, said arm members bearing rod-supporting lateral fingers, and a second position with said arms in side-by-side relationship with said leg member; and said arm members have a bend in a terminal end proximate the pivot connection with said leg member.

2. The invention, as claimed in claim 1, wherein, said bend in one arm being oppositly inclined to the bend in the other, said pivotable connection lies on a common axis, and wherein said finger members are lateral to said arm members and lie generally in the same plane when said arms are pivoted into side-by-side relationship with said leg member for space-saving storage position.

3. The invention, as claimed in claim 1, wherein said bend in one arm member is oppositely inclined to the bend in the other arm member.

4. The invention, as claimed in claim 3, wherein said pivotable connection lies on a common axis.

5. The invention, as claimed in claim 4, wherein said arm members each include lateral finger members configurated to support at least one fishing rod.

6. The invention, as claimed in claim 5, wherein said arm members include said lateral finger members on either side to provide support for two fishing rods.

7. The invention, as claimed in claim 5, wherein said finger members are lateral to said arm members and lie generally in the same plane when said arms are pivoted into side-by-side relationship with said leg member for space-saving storage position.

8. The invention, as claimed in claim 7, which includes a collar and pin, together with appropriate holes in said leg member, to secure said arm members in their relative sequential positions, as desired.

9. The invention, as claimed in claim 8, wherein said holder is formed of elongate stock of rectangular cross-sectional configuration.

10. The invention, as claimed in claim 1, which includes a collar and a pin, together with appropriate holes in said leg member, to secure said arm members in their relative sequential positions, as desired.

11. The invention, as claimed in claim 10, wherein said holder is formed of elongate stock of rectangular cross-sectional configuration.

* * * * *